(12) United States Patent
Alam et al.

(10) Patent No.: US 7,083,365 B2
(45) Date of Patent: Aug. 1, 2006

(54) ADJUSTABLE DRILLING APPARATUS AND ASSOCIATED METHOD

(75) Inventors: Mahboob Alam, Cypress, CA (US); Chorng-Lin S. Guo, Arcadia, CA (US); Thomas Richard Whetro, Garden Grove, CA (US)

(73) Assignee: The Boeing Company, Seattle, WA (US)

(*) Notice: Subject to any disclaimer, the term of this patent is extended or adjusted under 35 U.S.C. 154(b) by 452 days.

(21) Appl. No.: 10/273,915

(22) Filed: Oct. 18, 2002

(65) Prior Publication Data

US 2004/0076484 A1  Apr. 22, 2004

(51) Int. Cl.
*B23B 35/00* (2006.01)

(52) U.S. Cl. ............................ 408/1 R; 408/79; 408/92

(58) Field of Classification Search ................ 408/1 R, 408/79, 87, 88, 92, 95, 97, 110, 234
See application file for complete search history.

(56) References Cited

U.S. PATENT DOCUMENTS

| | | | | |
|---|---|---|---|---|
| 2,219,997 A | * | 10/1940 | Marangelo | 408/92 |
| 2,844,977 A | * | 7/1958 | Morse | 408/1 R |
| 2,963,927 A | * | 12/1960 | Hanger | 408/79 |
| 4,597,185 A | | 7/1986 | Ury | |
| 4,674,925 A | * | 6/1987 | Thornton et al. | 408/1 R |
| 4,856,945 A | * | 8/1989 | Bareis | 408/72 R |
| 5,062,746 A | * | 11/1991 | Deremo | 408/79 |
| 5,174,690 A | * | 12/1992 | Targett et al. | 408/1 R |
| 5,205,682 A | * | 4/1993 | Jinkins | 408/46 |
| 5,383,751 A | | 1/1995 | Wheetley et al. | |
| 6,296,426 B1 | * | 10/2001 | King et al. | 408/76 |
| 6,413,022 B1 | | 7/2002 | Sarh | |

FOREIGN PATENT DOCUMENTS

GB    2 299 772 A    10/1996

OTHER PUBLICATIONS

COOPERTOOLS; *Advanced Drilling Equipment—Doler® Self Colleting Machines*; Jul. 2001; pp. 4-13 and 4-18; SP-1300-0701-2.5M; CooperTools, Lexington, South Carolina and Houston, Texas.

* cited by examiner

*Primary Examiner*—Boyer D. Ashley
*Assistant Examiner*—J Williams
(74) *Attorney, Agent, or Firm*—Alston & Bird LLP

(57) ABSTRACT

The drilling apparatus of the present invention includes a platform and at least two independently adjustable members. The independently adjustable members position the platform relative to the structure such that the drilling tool is maintained in a predefined positional relationship to the surface of the structure. A portion of each of the independently adjustable members is in operable contact with the complexly curved surface at a respective contact point, and the independently adjustable members are capable of being extended by different lengths to the respective contact point in order to accommodate for the complexly curved surface. The method of the present invention includes determining the extension length required to position the drilling tool in the predefined positional relationship for each independently adjustable member based upon the radius of curvature at each member's contact point with the surface, and the predetermined distance between the drilling tool and each member.

26 Claims, 4 Drawing Sheets

ADJUSTABLE DRILLING APPARATUS AND ASSOCIATED METHOD

BACKGROUND OF THE INVENTION

The present invention relates to a drilling apparatus for drilling holes in structures and, in particular, to a drilling apparatus that drills holes in multi-layer structures, and that is adjustable to ensure the drilling tool is maintained in a predefined relationship, such as by being normal, to the area of the structure to be drilled, regardless of the shape of the surface of the structure.

The fasteners that hold together multi-layer structures, particularly those structures that are subject to significant dynamic forces and/or pressure over their lifetime, such as aircraft and other vehicle bodies, bridges, buildings, and others, must be properly secured in order to ensure that the structure will perform as intended over its lifetime. In order to properly secure a fastener in a multi-layer structure, the fastener hole must not have any sharp edges, i.e., burrs, the structure must be free of debris between the layers, and any sealant applied between the layers in order to make the structure air and/or water tight must be sufficiently squeezed out. When excess sealant is present between the layers, the distance between the layers is increased and/or uneven, which may be referred to as a "gasket" condition. Thus, if burrs, debris and/or excessive sealant are present, then the layers cannot be properly fastened and the layers may suffer corrosion, cracking and/or premature fatigue failure, which generally renders the structure ineffective for its intended purpose and, therefore, subject to the expense of repair or replacement.

Thus, ensuring that a burr-less hole is drilled, that there is no debris between the layers, and that sealant is properly applied between the layers is an integral part of clamping multi-layer structures together. In the aerospace industry, for example, a significant amount of time and labor is expended ensuring that the holes through the various layers of the aircraft structure are appropriately drilled, cleaned, sealed and fastened. Initially, the layers of materials that form the structure are loosely assembled without sealant, and drill templates are aligned and attached to the structure in the areas to be drilled. A drill operator, guided by the drill template, then drills holes through the layers of materials typically using a manual drill motor. As the hole is being drilled through the layers, the drill bit tip pushes with the full feed force applied to the drill motor. This can cause a gap to develop between a layer currently being drilled and the underlying layer, particularly when the layers are a stack-up of thin material. The gap between the layers causes burrs about the hole and debris is likely to gather between the layers. Thus, once the holes are drilled, the layers must be disassembled, the burrs must be removed from about the holes, and the debris must be cleaned from the surfaces of the layers, all of which is a time-consuming and labor intensive process.

Sealant is then applied to the layers prior to re-assembling the layers. In order to ensure the layers are properly sealed to provide an air and water-tight seal, a generous amount of sealant is applied to the layers. Clamps that extend through the holes, such as KWIK-LOK™ clamps commercially available from Zephyr Manufacturing Company, Inglewood, Calif., must be placed through each hole of the reassembled layers in order to squeeze out the sealant to prevent excessive "gasket" between the layers before the sealant dries. The extra sealant squeezes out around the clamps and must be cleaned from the structure and the clamps during clamping and/or after the clamps are removed.

Once the sealant is cured, the clamps may be removed and the holes may be countersunk. In order to countersink a hole, a countersink drill bit and microstop countersink cage are attached to the drill motor and the operator revisits each hole to drill the countersink. The holes are then inspected to ensure they were properly countersunk. The holes may be inspected by checking the countersink of each hole with a measuring tool, or by installing the fastener to check if it fits properly within the hole and countersink. If the holes are satisfactory, then fasteners may be installed and fastened with nuts or swage lock collars. Overall, this process is expensive, laborious, and time-consuming. In addition, the integrity of the resulting holes depends upon the completion of many manual processes, which creates a risk that certain steps may be performed inadequately or completely overlooked.

For structures that have a flat outer surface, a positive, power feed drill motor with a collet mandrel is capable of drilling, reaming and countersinking holes in multi-layer structures in one step. Examples of such positive power feed drill motors with a collet mandrel are the Q-matic/Spacematic drill motors, and, in particular the Q-matic 15SC Self-Colleting Drill Motor, produced under the name Quackenbush, and commercially available from Cooper Tools, Inc. To utilize these drill motors, a hole is initially drilled through the layers of material by conventional means, such as by using a conventional drill motor to drill a hole through the layers, then de-burring the hole and cleaning the debris from between the layers. Once the structure is reassembled, the collet is extended through the hole and secured with the mandrel on the side of the structure that is opposite the drill motor. The collet mandrel is typically attached to a platform of the drill motor such that the platform sets on the surface of the structure. The platform also generally has an opening that is aligned with the structure to be drilled, and the drilling tool of the drill motor may extend through the platform opening to drill through the structure. Thus, the collet mandrel securely holds the layers of the structure together such that holes may be drilled and countersunk within a predetermined distance from the collet mandrel in one step without the risk of debris accumulating between the layers. Once all of the desired holes have been drilled within the predetermined distance from the collet mandrel, the collet mandrel is removed from the hole and moved to one of the holes recently drilled or a new hole must be drilled for the collet mandrel, prior to repeating the process described above to form additional holes.

Holes are preferably drilled at a predefined orientation, such as a normal orientation, relative to the surface of the structure. As long as the surface of the structure is flat, the drilling tool of the drill motor will typically be normal to the structure to be drilled because the platform lies flat on the surface. Thus, so long as the platform is normal to the drilling tool, then the surface of the structure will also be normal to the drilling tool. If, however, the surface is contoured or three-dimensional, the drilling tool may not be normal to the area of the structure to be drilled because the platform cannot lie flat on the surface. Thus, the drill motor with the collet mandrel described above may include an adjustable foot pad to adjust the position of the platform, and therefore the drilling tool until the drilling tool is normal to the area of the structure to be drilled. The adjustable foot pad is typically attached to the drill motor platform opposite the side of the platform with the opening, and is adjustable to various positions based upon the radius of curvature of the surface and the distance from the foot pad to the drilling tool. This design is suitable for simple contours with only one radius of curvature between the foot pad and the drilling tool, i.e., for surfaces that curve in only one dimension, because the adjustable foot pad maintains contact with the contoured surface across the full width of the pad. If, however, more than one radius of curvature is present between the foot pad and the drilling tool, such as in complexly curved surfaces exhibiting curvature in two or more dimensions, the pad cannot maintain contact with the surface across the width of the pad because the curvature of the surface may be different at one side of the foot pad than it is at the other side of the foot pad. Thus, the conventional adjustable foot pad is not capable of ensuring that the drilling tool is normal or in any other predefined relationship to the surface of the structure to be drilled when the surface of the structure is complexly curved. As such, to drill a hole in a multi-layer structure having a complex curvature, the holes must be drilled in the conventional manner of drilling, de-burring, cleaning the layers, then reassembling and sealing the layers before countersinking the holes, which is a time-consuming and labor-intensive process, as discussed above.

Therefore, a need exists to drill holes in multi-layer structures having surfaces that are at least partially complexly curved in a more efficient manner, such as by reducing or eliminating the time and expense involved in disassembling the drilled layers, de-burring the holes, cleaning the debris from the layers, reassembling the layers, clamping the holes, waiting for the sealant to dry, and revisiting the holes to drill the countersink. In particular, there is a need to efficiently drill holes in multilayer structures having surfaces that are at least partially complexly curved in one operation, such that the time and money involved in the manufacture of such multilayer structures is significantly reduced.

BRIEF SUMMARY OF THE INVENTION

The adjustable drilling apparatus and associated method of the present invention provide the ability to drill holes in structures having surfaces that are at least partially complexly curved without expending the time and expense involved in the conventional drilling techniques for complexly curved surfaces. Because the drilling apparatus of the present invention includes an adjustment mechanism that accommodates the complexly curved surface, the drilling apparatus may be positioned in a predefined positional relationship to the surface. Holes may then be efficiently drilled, and optionally countersunk, in the complexly curved surface in one operation.

In one embodiment of the drilling apparatus of the present invention, the drilling apparatus includes a drilling tool, a platform to which the drilling tool is secured, and at least two independently adjustable members. In alternative embodiments, the drilling apparatus may include a platform and at least two independently adjustable members that are located a predetermined distance from the platform.

In either embodiment described above, the independently adjustable members position the platform relative to the structure such that the drilling tool is maintained in a predefined positional relationship to the surface of the structure. A portion of each of the independently adjustable members is in operable contact with the complexly curved surface at a respective contact point. In addition, the independently adjustable members are capable of being extended by different lengths to the respective contact point in order to accommodate the complexly curved surface. Thus, each independently adjustable member may be extended to the appropriate length such that the drilling tool is maintained in the predefined positional relationship to the structure.

The independently adjustable members also may be threaded to permit the adjustment of the members to the appropriate length. The distal ends of the independently adjustable members may be covered with a coating, such as nylon, and adapted to be placed in operable contact with the surface without marring or otherwise damaging the surface.

Embodiments of the drilling apparatus may also include a housing that is attached to the platform. The housing may define at least two openings through which the independently adjustable members may extend. If the independently adjustable members are threaded, the housing may have cooperating threads to therefore permit the desired adjustment of members relative to the housing.

The drilling apparatus also may have at least one locking member to lock the independently adjustable members in position when the drilling tool is set in the predefined positional relationship to the surface of the structure. Furthermore, the drilling apparatus may include a clamping element near an opening defined by the platform. The clamping element may attach to the platform and extend through an opening defined by the structure to fasten the drilling apparatus to the structure. If the structure is made of multiple layers of material, then the clamping element may attach to the platform and extend through an opening in the layers to securely clamp the layers together, in addition to fastening the drilling apparatus to the structure.

Other embodiments of the drilling apparatus of the present invention include a drilling tool, a platform to which the drilling tool is secured, and at least one threaded adjustable member. The threaded adjustable member(s) position the platform relative to the structure such that the drilling tool is maintained in a predefined positional relationship to the surface of the structure. In addition, the distal end of threaded adjustable member(s) in this embodiment are at least partially surrounded by a coating, such as nylon. As such, the coated distal end is capable of being placed in operable contact with the surface of the structure without harming the surface.

This embodiment of the drilling apparatus of the present invention also may include a housing with at least one opening through which the threaded adjustable member(s) may extend. The opening(s) in the housing may have threads that cooperate with the threaded adjustable member(s) to facilitate adjustment of the member(s). In addition, the threaded adjustable member(s) may be locked into position with at least one locking element. As described above, this embodiment of the drilling apparatus of the present invention also may include a clamping element for fastening the drilling apparatus to the structure.

Another aspect of the present invention involves a method for maintaining a drilling tool of a drilling apparatus in a predefined positional relationship relative to a structure having a surface that is at least partially complexly curved. The method includes determining the radius of curvature of the complexly curved surface at each point of contact between the surface and at least two independently adjustable members of the drilling apparatus. The method of the present invention also involves determining the extension length required for each independently adjustable member to position the drilling tool in the predefined positional relationship. Determining the extension length for a particular independently adjustable member is based upon the radius of curvature at the adjustable member's contact point with the surface, and the predetermined distance between the drilling tool and the adjustable member. In addition, the method of the present invention includes adjusting each independently adjustable member to the respective determined extension length in order to place the drilling tool in the predefined positional relationship to the surface.

The method of the present invention also may involve positioning the drilling apparatus on the surface of the structure prior to adjusting each independently adjustable member. Alternatively, the drilling tool may be positioned on the surface of the structure subsequent to adjusting each independently adjustable member. After the independently adjustable members are adjusted as desired, each adjustable member may be locked into position, such as with the locking element described above.

Certain embodiments of the method of the present invention also may include fixing the drilling apparatus to the structure. If the structure is made of multiple layers of material that define an opening, then the drilling apparatus may be fixed to the structure by extending a clamping element attached to the drilling apparatus through the opening to hold the layers together and to fix the structure to the drilling apparatus.

Therefore, the drilling apparatus and associated method of the present invention provide efficient drilling of holes in complexly curved surfaces because of an adjustment mechanism that accommodates for the complex curves. By accommodating for the complex curves, the drilling apparatus and in turn, the drilling tool may be positioned in a predefined positional relationship to the surface of the structure to ensure that the holes will be drilled at the desired orientation. As such, the drilling apparatus and method of the present invention do not involve the time and expense that is required to drill holes in complexly curved surfaces using a conventional technique.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
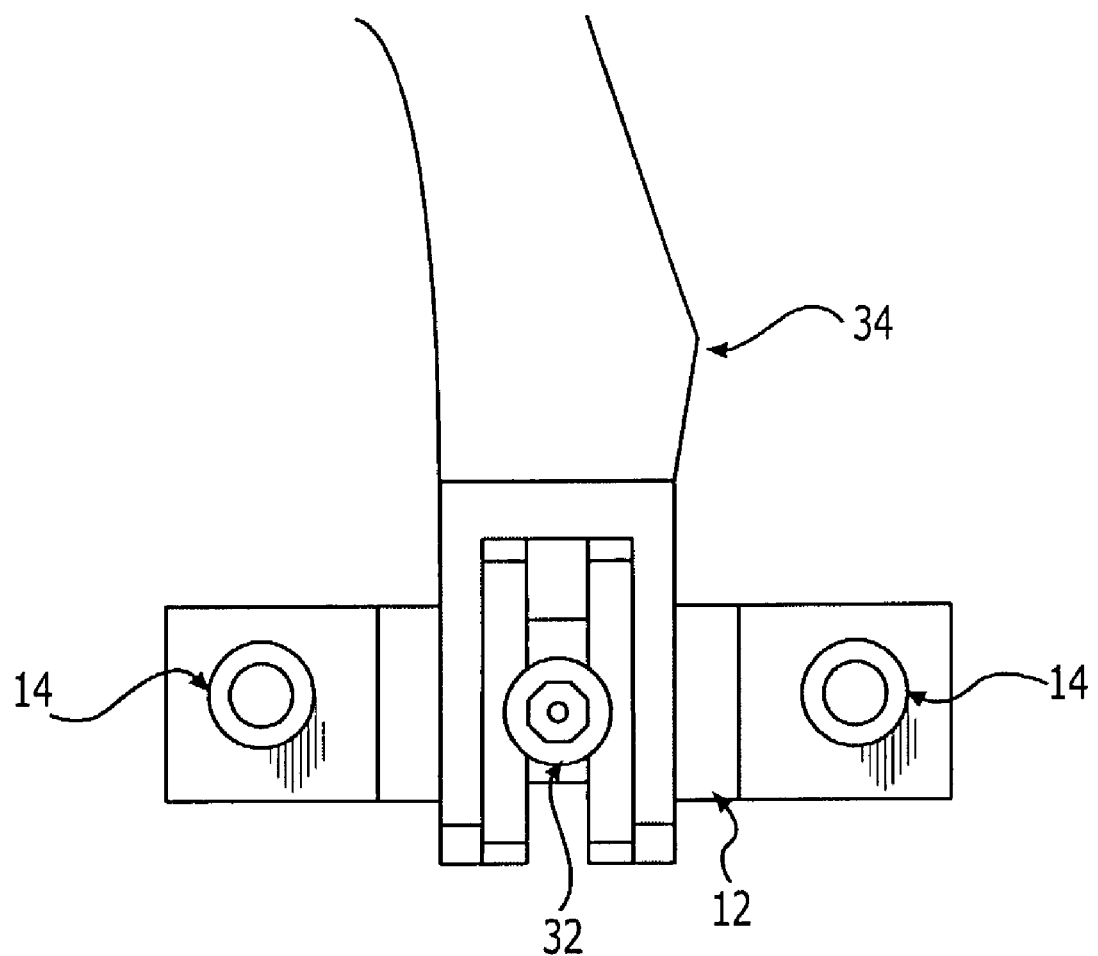
Figure 6:
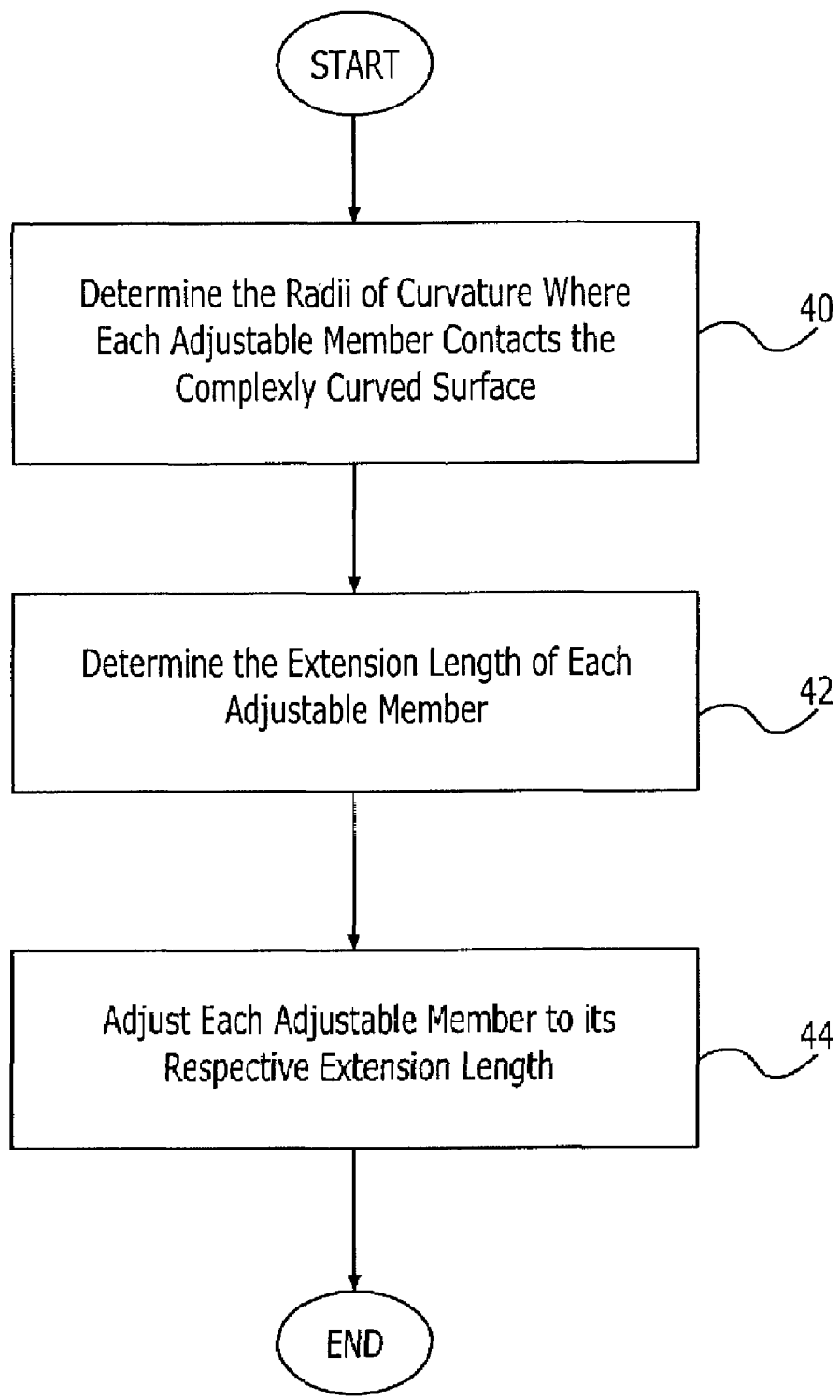

FIG. 5 is a top planar view of two independently adjustable members within a housing that is attached to a drilling apparatus according to one embodiment of the present invention; and FIG. 6 is a flow diagram of a method for maintaining a drilling tool of a drilling apparatus in a predefined positional relationship to a structure having a complexly contoured surface, according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The drilling apparatus of the present invention is capable of drilling holes at a desired orientation into a structure having a surface that is complexly curved, i.e. exhibiting curvature in two or more dimensions. To adjust the drilling apparatus to the desired orientation, the drilling apparatus includes an adjustment mechanism that is capable of accommodating the complex curvature of the surface. The drilling apparatus may be any type of power feed drill motor to which the adjustment mechanism described hereinbelow is attached. The power feed drill motor may also have a clamping element, such as a collet mandrel, for securing the drill motor to the structure that is to be drilled. One example of this type of drill motor is a Q-matic 15SC self-colleting drill motor.

Figure 1:
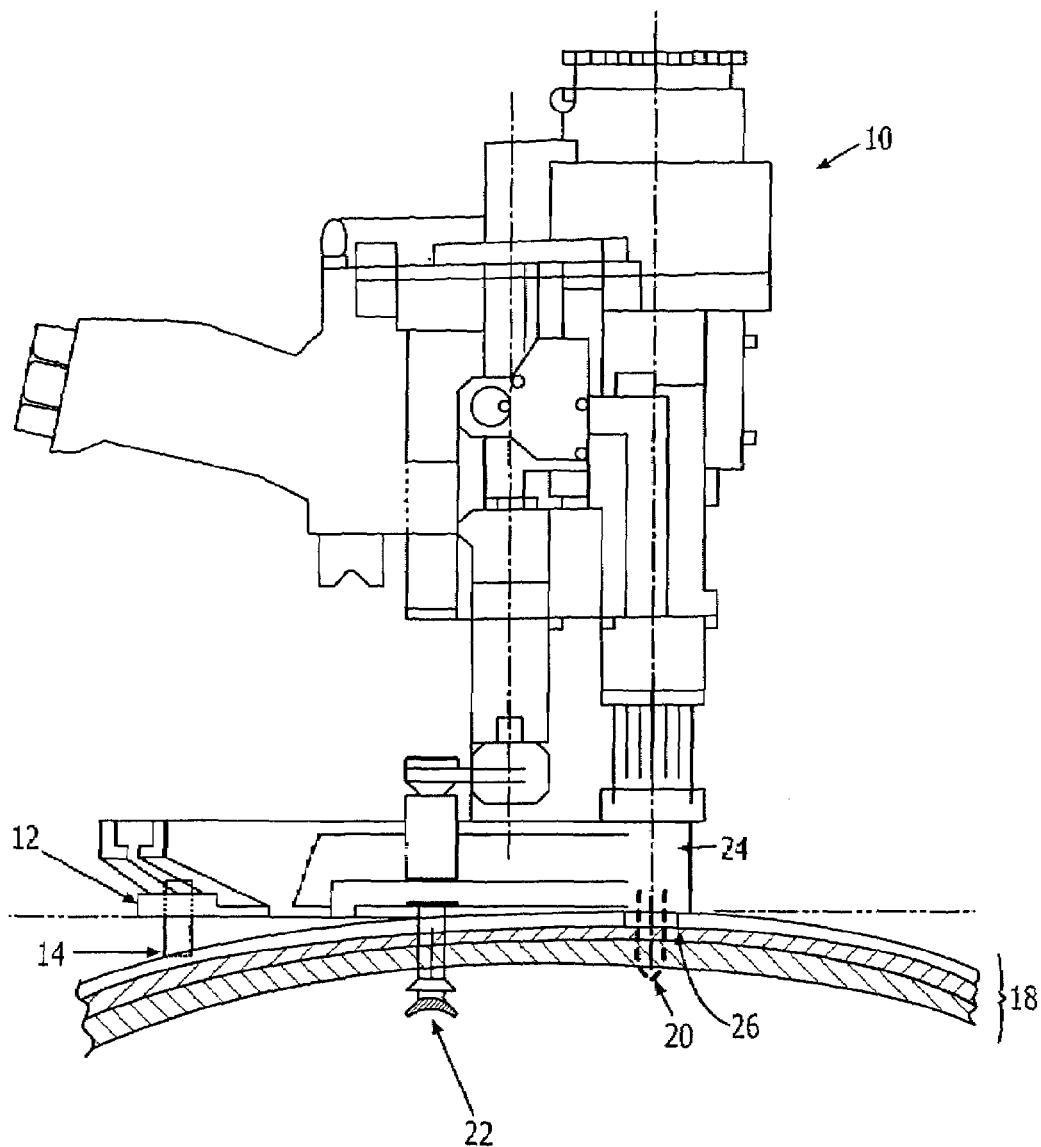
FIG. 1 is a partial side cross-section view of a drilling apparatus with a platform and at least one threaded adjustable member, in which the apparatus is fastened to a complexly contoured surface according to one embodiment of the present invention.

FIG. 1 illustrates such a drilling apparatus 10, including an adjustment mechanism. The adjustment mechanism shown in the embodiment of FIG. 1 has a template foot pad housing 12 and at least two adjustable members 14. The drilling apparatus 10, therefore, may be placed in a desired orientation with respect to the surface of the structure 18 by appropriately adjusting each of the adjustable members 14. For example, the drilling apparatus 10 may be oriented such that the longitudinal axis of the drilling tool 20 is normal to the point on the surface of the structure 18 to be drilled, if it is desired that the resulting drilled hole be normal to the surface.

The drilling tool 20 may be any type of drilling tool known to those skilled in the art, and may be shaped to drill a countersunk hole, if desired. For example, a drilling tool referred to as a dreamer may be utilized with the power feed drill motor. A dreamer drilling tool is capable of drilling, reaming, and countersinking holes in a structure in one step.

Figure 2:
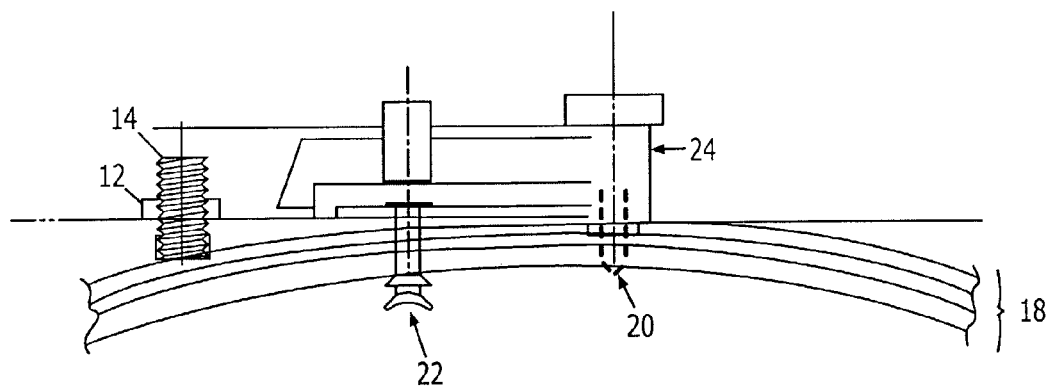
FIG. 2 is a side cross-section view of a platform and at least one threaded adjustable member that are fastened to a complexly contoured surface according to one embodiment of the present invention.

As shown in FIG. 1, the structure 18 may be made of multiple layers, all of which should be drilled in order to define a hole through the layers. To drill the hole through the layers, the layers are held together by any manner known to those skilled in the art, such as with a clamping element 22, as shown in the embodiment of FIG. 1. One example of a clamping element 22 is a collet mandrel that is attached to the platform 24 of the drilling apparatus, and extends through an existing hole in the layers of the structure 18. FIG. 2 illustrates another embodiment of the platform 24 that is attached to a housing 12 and adjustable members 14 of an adjustment mechanism, and that is fastened to the structure 18 via a clamping element 22. The length of the collet mandrel, i.e. the grip length, is longer for curved surfaces than for flat surfaces, in order to compensate for the curvature of the surface and extend through the structure 18. The collet mandrel is then secured on the side of the structure 18 opposite the drilling apparatus 10 to hold the layers of the structure 18 together as the drilling tool 20 impinges upon the structure.

Regardless of the type of clamping element 22 utilized, it advantageously holds the layers of the structure 18 together tightly enough to prevent debris that is created as the hole is drilled through the layers from being trapped between the layers, so long as the hole is drilled within a predetermined distance from the clamping element 22. For example, the collet mandrel of a Q-matic 15SC self-colleting drill motor provides approximately 200 pounds of offset clamp-up, i.e. force to the structure.

The drilling apparatus 10 also may include a debris removal system, such as a vacuum system as shown in the art, that moves the debris out of the hole as it is being drilled to further ensure that the debris does not get pushed into and trapped between the layers of the structure 18. Moreover, a sealant may be applied between the layers of the structure 18 to also prevent debris movement between the layers. If a sealant is utilized between the layers, it preferably has a relatively high viscosity, which more effectively prevents debris from moving between the layers than sealants with a lower viscosity. Typically, sealants having a relatively quick curing time have a higher viscosity, and may be utilized for this application. One example of a quick curing sealant is type 4 sealant, DPM2292-6, commercially available from Pre-DeSoto International, Inc. of Glendale, Calif.

As described above, the structure 18 may be made of multiple layers. In one embodiment of the present invention, the layer closest to the drilling apparatus 10 may be a drill template, if desired. The drill template generally matches the curvature of the structure 18 and temporarily attaches to the structure 18 by any manner known to those skilled in the art. The drill template typically includes a plurality of holes, at least one of which is aligned with an area of the structure 18 to be drilled. One of these holes may be aligned with a predetermined hole in the structure such that the clamping element 22 may extend through the aligned holes in the drill template and the structure 18 to secure the drill template to the structure 18. The drilling tool may then be extended through another hole defined by the template. In one embodiment, the drilling apparatus includes a bushing 26, i.e. a template boss, that at least partially surrounds the drilling tool 20. The bushing 26 may therefore be aligned with, such as by being at least partially positioned within, another hole in the drill template in order to, therefore, align the drilling tool 20 with the area of the structure 18 to be drilled.

Figure 3:
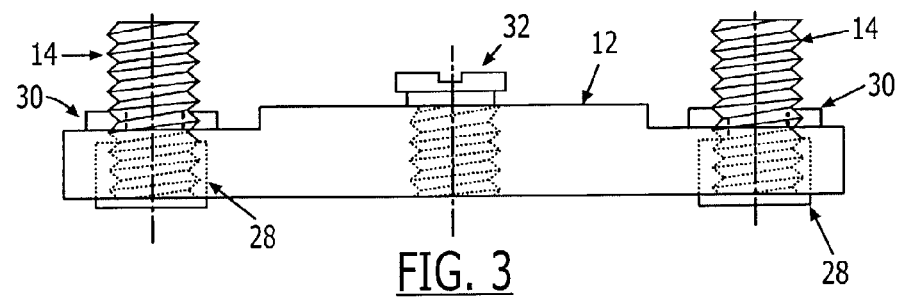
FIG. 3 is a side cross-section view of two independently adjustable members within a housing according to one embodiment of the present invention.
Figure 4:
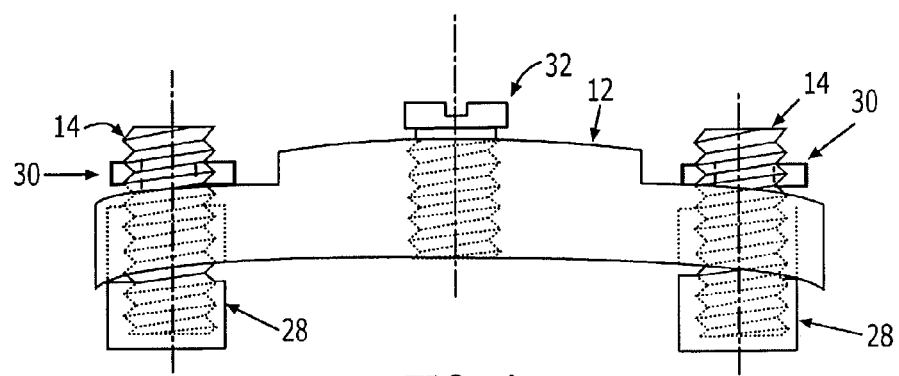
FIG. 4 is a side cross-section view of two independently adjustable members within a curved housing according to one embodiment of the present invention.

As briefly described above, the adjustment mechanism shown in the embodiments of FIGS. 1 and 2 may include a template foot pad housing 12 and at least two adjustable members 14. The adjustable members are independently adjustable, i.e., the adjustment of one of the adjustable members does not affect the adjustment of the other adjustable member(s). The adjustable members can, therefore, compensate for the complex curvature of the surface of the structure 18 in order to orient the drilling apparatus and, in turn, the drilling tool 20 as desired relative to the structure 18. As shown in FIGS. 2, 3 and 4, the adjustable members 14 may be threaded and, if so, the housing 12 may have openings that are at least partially correspondingly threaded to receive the adjustable members 14 and permit the independent adjustment of each of the members with respect to the housing 12. For example, in a particular embodiment of the present invention, one rotation of a threaded adjustable member 14 is equivalent to one-sixteenth of an inch movement of the adjustable member 14 with respect to the housing 12 in a direction determined by the longitudinal axis of the adjustable member. However, the adjustable members need not be threaded but may be adjustably connected to the housing in other manners, if desired.

FIGS. 3 and 4 illustrate embodiments of the template foot pad housing 12 and the adjustable members 14. The adjustable members 14 may include a coating 28 at least partially surrounding the distal end of the adjustable members 14. The coating 28 may be made of any type of non-marring material in order to prevent the adjustable members 14 from harming the surface of the structure when the adjustable members 14 are in contact with the surface. For example, the coating 28 may be made of nylon and/or polypropylene. The coating 28 may be a thin covering, such that the shape of the coating 28 conforms to the shape of the distal ends of the adjustable members 14. In an alternative embodiment, the coating 28 may be in the form of a cap surrounding the distal end of the adjustable members 14, such that the shape of the distal end of the adjustable member is the shape of the cap, which is shown in FIGS. 3 and 4. Thus, the openings defined by the housing 12 are capable of receiving the distal ends of the adjustable members 14 with the coating 28, regardless of the shape of the coating 28, as illustrated in FIG. 2.

Once each of the adjustable members 14 is adjusted to the desired position, as explained hereinbelow, the adjustable members 14 may be secured in that position by any means known to those skilled in the art. As shown in FIGS. 3 and 4, a locking element 30, such as a lock nut or a collar may be threaded or clamped onto an adjustable member 14 on the side of the housing 12 facing opposite the surface of the structure 18. The locking element 30 therefore prevents an adjustable member 14 from being further adjusted until the locking element 30 is removed from the respective adjustable member 14.

The housing 12 may be made of any type of material that will provide stability for the adjustable members 14. For instance, the housing 12 may be made of a high-strength material, such as a metallic material, particularly high-strength aluminum and/or steel. As described above, the housing 12 may define openings to receive the adjustable members 14, and to permit the movement of the adjustable members 14 relative to the housing 12.

The housing 12 may be shaped in an appropriate manner in order to permit the desired movement of the adjustable members 14 relative to the housing 12 and the surface of the structure 18. While the housing will be described below as a box-like structure, the housing need not be an enclosure but may have other forms such as a plate that defines the openings. As shown in FIG. 3, however, the housing 12 may be a box-like structure with planar sides. For this housing embodiment and for a complexly curved surface, each adjustable member 14 is adjusted to accommodate variations in the complexly curved surface in multiple dimensions. FIG. 4 illustrates another embodiment of the housing 12 having curved sides. For a complexly curved surface, the curvature of at least the side of the housing 12 facing the surface of the structure preferably matches the curvature of the complexly curved surface in at least one dimension. As such, each adjustable member 14 need only be adjusted for variations of the complexly curved surface in one other dimensions not provided by the housing.

The adjustable members 14 may be attached to the platform 24 of the drilling apparatus 10 in any manner known to those skilled in the art. For example, as shown in FIGS. 3 and 4, the housing 12 may define an opening at least partially through the housing 12 to receive an attachment element 32, such as a screw or other type of fastener. As shown in more detail in the embodiment of the housing 12 illustrated in FIG. 5, the attachment element 32 may connect the housing 12 and, therefore, the adjustable members 14, to the platform 24 of the drilling apparatus 10 via arm 34. Arm 34 may be capable of also receiving the attachment element 32, such that the arm 34 is sandwiched between the housing 12 and the head of the attachment element 32. Thus, when the attachment element 32 is secured, the arm 34 is therefore secured to the housing 12. The opening in the arm 34 may be shaped as shown in FIG. 5, such that the position of the housing 12 is adjustable relative to the arm 34 by placing the attachment element 32 at the desired location in the opening of the arm 34 prior to securing the attachment element 32.

The housing may be connected to the platform 24 of the drilling apparatus 10 in other manners. In other embodiments of the drilling apparatus of the present invention, for example, the housing 12 may be part of the platform 24 of the drilling apparatus 10 or directly/permanently attached to the platform 24. In still further embodiments of the drilling apparatus of the present invention, the adjustable members 14 may be in direct communication with the platform 24. For example, the platform 24 may define respective openings to receive the adjustable members 14 and to permit movement of the adjustable members 14 relative to the platform 24, such that the drilling apparatus need not include a housing.

Thus, the drilling apparatus 10 of the present invention may be oriented as desired relative to a surface of a structure, even if the surface is complexly curved. Because the adjustable members 14 are capable of being independently adjusted, each adjustable member may be adjusted appropriately to compensate for the particular dimensions of the curvature between the point where the adjustment member contacts the surface and the area of the surface to be drilled.

Another embodiment of the drilling apparatus 10 of the present invention is similar to the drilling apparatus described above, except that it includes at least one threaded adjustable member 14. Therefore, the drilling tool 20 of the drilling apparatus 10 is secured to a platform 24, as described hereinabove, and the at least one threaded adjustable member 14 is capable of positioning the platform 24 relative to the structure 18 such that the drilling tool 20 is maintained in a predefined positional relationship to the surface of the structure.

The distal end(s) of the threaded adjustable member(s) 14 of this embodiment are also at least partially coated, as described hereinabove. Each threaded adjustable member 14 may extend through a housing 12 that is attached to the platform 24 in any manner known to those skilled in the art, as also described hereinabove. Alternatively, each threaded adjustable member 14 may extend through the platform 24, and move relative to the platform 24. The housing 12 and/or the platform 24, therefore defines openings to receive the respective threaded adjustable member(s) 14, and the openings are at least partially correspondingly threaded to permit movement of the threaded adjustable member(s) 14 relative to the housing 12 and/or platform 24.

In the same way as described hereinabove, the at least one threaded adjustable member 14 may be locked in position in the predefined positional relationship to the surface of the structure 18 with a respective locking element. In addition, the platform 24 may be fastened to the structure 18 with a clamping element 22.

In embodiments of the drilling apparatus 10 having only one threaded adjustable member 14, the threaded adjustable member 14 may compensate for the curvature of the surface of the structure 18 between the point of contact of the adjustable member 14 and the area of the structure 18 to be drilled. The surface may therefore be complexly curved, so long as the compensation that the single adjustable member is capable of providing is sufficient to orient the drilling tool 20 as desired. If compensating for the area of curvature described above is not sufficient to orient the drilling tool 20 as desired, then more than one threaded adjustable member 14 may be utilized to further compensate for the complex curvature of the surface.

FIG. 6 is a flow diagram of one method of maintaining the drilling apparatus, and, therefore, the drilling tool of the drilling apparatus, in a predefined positional relationship, such as a normal relationship, relative to the structure having an at least partially complexly curved surface. As such, the appropriate extension length of each adjustable member 14 is determined in order to orient the drilling tool of the drilling apparatus as desired. The extension length is the length of the adjustment member 14 extending between the drilling apparatus, such as the housing 12 and/or the platform 24, and the surface of the structure 18 with which the adjustable member will make contact. To determine the appropriate extension length for a particular adjustable member, the radius of curvature of the surface at the point of contact between the surface and the adjustable member is determined, as shown by step 40. For example, the radius of curvature may be determined from a Computer Aided Drawing (CAD) of the structure or by measuring the radius in any manner known to those skilled in the art. In addition, the distance of the adjustable member from the drilling tool is known. Thus, the appropriate extension length may then be determined based upon the determined radius of curvature and the known distance, as illustrated by step 42. For example, in one embodiment of the adjustable drilling apparatus and associated method of the present invention, the extension length is equal to the predetermined distance (d) between the drilling tool 20 and each adjustable member 14, multiplied by the curvature change®) at the point of contact between the surface and the adjustable member 14, in radian. Alternatively the extension length may be approximately equal to $(\sqrt{(R^2+d^2)}-R) \times (R/(\sqrt{(R^2+d^2)}))$, where R=radius of curvature at the point of contact between the surface and the adjustable member 14. Once the extension length is determined for a particular adjustable member 14, it may be adjusted to the extension length, as shown by step 44. Each adjustable member 14 is adjusted independently, such that the adjustment of one member does not affect the adjustment of the other member(s). For example, if the adjustable member is threaded, the adjustment member 14 may be twisted or otherwise moved relative to the housing 12 and/or platform 24 to move the adjustment member 14 relative to the housing 12 and/or platform 24, respectively. After adjusting the adjustable member(s) to the desired extension length, the member(s) may be locked in position by any means known to those skilled in the art, such as with a respective locking element 30 as described hereinabove.

The adjustable members 14 may be adjusted prior to or subsequent to positioning the drilling apparatus 10 on the surface of the structure. Thus, if the radii of curvature of the surfaces of particular structures are known, the adjustable members 14 may be adjusted to the respective extension lengths prior to positioning the drilling apparatus 10 on the surface. Alternatively, the drilling apparatus 10 may be placed on the surface, then the adjustable members 14 may be adjusted to the respective extension lengths after the respective extension lengths are determined. The drilling apparatus may be secured to the structure in any manner known to those skilled in the art, such as with a clamping element 22 as described hereinabove. After the drilling tool 20 is oriented as desired relative to the surface of the structure 18, the drilling apparatus may be activated in order to cause the drilling tool 20 to drill the desired hole in the structure 18. Once the hole is drilled in the structure 18, any type of fastener known to those skilled in the art then may be inserted to extend through the hole in order to securely hold a component to the structure and/or to hold the layers of the structure together.

Furthermore, another embodiment of a method of maintaining the drilling apparatus 10, and, therefore, the drilling tool 20 in a predefined positional relationship to the structure may include placing the drilling apparatus 10 on the surface, then adjusting each of the independently adjustable members 14 until the drilling tool 20 is oriented as desired. For instance, the independently adjustable members 14 may be adjusted until the drilling tool 20 is oriented as desired based upon a visual inspection, or based upon any type of measurement tool known to those skilled in the art for measuring the positional relationship of the drilling tool 20 to the area of the structure 18 to be drilled.

Thus, the apparatus and method of the present invention provide an efficient and effective technique to orient a drilling tool as desired relative to the surface of a structure, when the surface is at least partially curved and/or complexly curved. By accommodating for the complex curves, the drilling apparatus, and, in turn, the drilling tool may be positioned in a predefined positional relationship to the surface of the structure to ensure that the holes will be drilled at the desired orientation. As such, the apparatus and method of the present invention save time and money when drilling holes at desired orientations, particularly in complexly curved surfaces, as compared to conventional techniques.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A drilling apparatus for drilling holes in a structure having a surface that has a complex curvature, comprising:
   a drilling tool;
   a platform to which said drilling tool is secured;
   a housing attached to said platform such that said housing is adjustably extendible relative to said platform; and
   at least two independently adjustable members carried by said housing for positioning said platform relative to the structure such that said drilling tool is maintained in a predefined positional relationship to the surface of the structure, wherein a portion of each independently adjustable member is in operable contact with the complexly curved surface at a respective contact point, and wherein said independently adjustable members are capable of being extended by different lengths to the respective contact point to accommodate for the complexly curved surface.

2. The drilling apparatus of claim 1, wherein said independently adjustable members are threaded.

3. The drilling apparatus of claim 1, wherein said each independently adjustable member has a distal end covered with a coating and adapted to be placed in operable contact with the surface.

4. The drilling apparatus of claim 3, wherein the distal end of each independently adjustable member is coated with nylon.

5. The drilling apparatus of claim 1, wherein said housing defines at least two openings through which said independently adjustable members extend.

6. The drilling apparatus of claim 1, further comprising at least one locking element for locking said independently adjustable members in position when said drilling tool is positioned in the predefined positional relationship to the surface of the structure.

7. The drilling apparatus of claim 1, further comprising a clamping element proximate an opening defined by said platform, and wherein said clamping element is attached to said platform and extends through an opening defined by the structure to fasten the drilling apparatus to the structure.

8. The drilling apparatus of claim 1, wherein the structure comprises a plurality of layers of material that define an opening through the layers, and further comprising a clamping element proximate an opening defined by said platform, wherein said clamping element is attached to said platform and extends through the layers to clamp the layers together and to fasten the drilling apparatus to the structure.

9. A drilling apparatus for drilling holes in a structure having a surface that has a complex curvature, comprising:
   a platform;
   a housing attached to said platform and defining at least two openings; and
   at least two independently adjustable members extending through respective openings defined by said housing for positioning said platform relative to the structure such that said platform is maintained in a predefined positional relationship to the surface of the structure, wherein a portion of each independently adjustable member is in operable contact at respective contacts points with the complexly curved surface, wherein said independently adjustable members are located a predetermined distance from said platform, wherein said independently adjustable members are capable of being extended by different lengths to the respective contact point to accommodate for the complexly curved surface, and wherein each independently adjustable member has a distal end covered with a coating and adapted to be placed in operable contact with the surface.

10. The drilling apparatus of claim 9, wherein said independently adjustable members are threaded.

11. The drilling apparatus of claim 9, wherein the distal end of each independently adjustable member is coated with nylon.

12. The drilling apparatus of claim 9, wherein said housing is adjustably extendible relative to said platform.

13. The drilling apparatus of claim 9, further comprising at least one locking element for locking said independently adjustable members in position when said drilling tool is positioned in the predefined positional relationship to the surface of the structure.

14. The drilling apparatus of claim 9, further comprising a clamping element proximate an opening defined by said platform, and wherein said clamping element is attached to said platform and extends through an opening defined by the structure to fasten the drilling apparatus to the structure.

15. A drilling apparatus for drilling holes in a structure having a curved surface, comprising:
   a drilling tool;
   a platform to which said drilling tool is secured;
   a housing attached to said platform and defining at least one opening; and
   at least one threaded adjustable member extending through the at least one opening defined by said housing for positioning said platform relative to the structure such that said drilling tool is maintained in a predefined positional relationship to the surface of the structure, and wherein each threaded adjustable member comprises a distal end and a coating at least partially surrounding the distal end such that the coated distal end is capable of being placed in operable contact with the surface.

16. The drilling apparatus of claim 15, wherein the coating at least partially surrounding the distal end of each threaded adjustable member is made of nylon.

17. The drilling apparatus of claim 15, wherein said housing is adjustably extendible relative to said platform.

18. The drilling apparatus of claim 15, further comprising at least one locking element for locking said threaded adjustable member in position when said drilling tool is positioned in the predefined positional relationship to the surface of the structure.

19. The drilling apparatus of claim 15, further comprising a clamping element proximate an opening defined by said platform, and wherein said clamping element is attached to said platform and extends through an opening defined by the structure to fasten the drilling apparatus to the structure.

20. The drilling apparatus of claim 15, wherein the structure comprises a plurality of layers of material that define an opening through the layers, and further comprising a clamping element proximate an opening defined by said platform, wherein said clamping element is attached to said platform and extends through the layers to clamp the layers together and to fasten the drilling apparatus to the structure.

21. A method for maintaining a drilling tool of a drilling apparatus in a predefined positional relationship relative to a structure having a surface that is at least partially complexly curved, comprising:

determining a radius of curvature of the complexly curved surface at each point of contact between the surface and at least two independently adjustable members of the drilling apparatus;

determining an extension length of each independently adjustable member required to position the drilling tool in the predefined positional relationship to the surface of the structure, wherein each independently adjustable member is located a predetermined distance from the drilling tool, and wherein determining the extension length of each independently adjustable member is based upon the radius of curvature and the predetermined distance associated with the independently adjustable member; and adjusting each independently adjustable member to the respective determined extension length to place the drilling tool in the predefined positional relationship to the surface.

22. The method of claim 21, further comprising positioning the drilling apparatus on the surface of the structure, prior to adjusting each independently adjustable member.

23. The method of claim 21, further comprising positioning the drilling apparatus on the surface of the structure subsequent to adjusting each independently adjustable member.

24. The method of claim 21, further comprising fixing the drilling apparatus to the structure.

25. The method of claim 24, wherein the structure comprises a plurality of layers of material defining an opening through the layers, and wherein fixing the drilling apparatus to the structure comprises extending a clamping element that is attached to the drilling apparatus through the opening defined by the layers to hold the layers together and to fix the structure to the drilling apparatus.

26. The method of claim 21, further comprising locking each independently adjustable member in position subsequent to adjusting each independently adjustable member.

* * * * *